(12) United States Patent
Cui et al.

(10) Patent No.: US 11,363,654 B2
(45) Date of Patent: Jun. 14, 2022

(54) SESSION MAPPING IN 5G AND SUBSEQUENT GENERATION NETWORKS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Paul Smith, Jr., Heath, TX (US); Sangar Dowlatkhah, Cedar Hill, TX (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 211 days.

(21) Appl. No.: 16/573,783

(22) Filed: Sep. 17, 2019

(65) Prior Publication Data
US 2021/0084702 A1 Mar. 18, 2021

(51) Int. Cl.
| | | |
|---|---|---|
| *H04W 76/15* | (2018.01) | |
| *H04W 76/11* | (2018.01) | |
| *H04W 92/10* | (2009.01) | |
| *H04W 92/04* | (2009.01) | |
| *H04W 88/08* | (2009.01) | |

(52) U.S. Cl.
CPC ............ *H04W 76/15* (2018.02); *H04W 76/11* (2018.02); *H04W 88/08* (2013.01); *H04W 92/045* (2013.01); *H04W 92/10* (2013.01)

(58) Field of Classification Search
CPC ..... H04W 76/15; H04W 76/11; H04W 88/08; H04W 92/045; H04W 92/10
See application file for complete search history.

(56) References Cited

U.S. PATENT DOCUMENTS

| | | | | |
|---|---|---|---|---|
| 2009/0310535 | A1* | 12/2009 | Anumala | H04L 12/4662 370/328 |
| 2014/0269551 | A1* | 9/2014 | Henderickx | H04W 76/12 370/329 |
| 2018/0097894 | A1* | 4/2018 | Li | H04L 67/141 |
| 2018/0109590 | A1* | 4/2018 | Rao | H04L 67/04 |
| 2018/0109624 | A1* | 4/2018 | Jayaraman | H04W 12/06 |
| 2018/0192390 | A1* | 7/2018 | Li | H04W 36/14 |
| 2021/0044675 | A1* | 2/2021 | Frydman | H04W 8/005 |
| 2021/0099316 | A1* | 4/2021 | Wang | H04M 15/64 |

* cited by examiner

*Primary Examiner* — Jeffrey M Rutkowski
*Assistant Examiner* — Jasper Kwoh
(74) *Attorney, Agent, or Firm* — Amin, Turocy & Watson, LLP

(57) ABSTRACT

The described technology is generally directed towards session mapping in multi-access communication networks. A main session can be established between a mobile edge computing device (MEC) and a core network. The MEC can also establish multiple respective virtual sessions with multiple respective access network computing devices, and the MEC can map the main session to the multiple respective virtual sessions. A user equipment (UE) can connect to any of the respective access network computing devices, thereby communicating via any of the respective virtual sessions.

20 Claims, 10 Drawing Sheets

SESSION MAPPING IN 5G AND SUBSEQUENT GENERATION NETWORKS

TECHNICAL FIELD

The subject application is related to wireless communications systems in general, and to fifth generation (5G) and subsequent generation cellular communications systems in particular.

BACKGROUND

Mobile edge computing, also referred to as multi-access edge computing, provides network architectures with computing capabilities at edges of cellular communications networks. For example, mobile edge computing technology can be implemented at cellular base stations and other edge nodes. Relatively early stage mobile edge computing technologies are a feature of fifth generation (5G) cellular networks, and mobile edge computing technologies show promise for further development in 5G and subsequent network deployments.

Mobile edge computing technology enables flexible and rapid deployment of new applications and services for cellular subscribers. Furthermore, by running applications and performing processing closer to cellular subscribers, faster speeds can be achieved and network congestion can be reduced. Mobile edge computing also allows cellular operators to open their radio access networks (RANs) to third parties, such as application developers and content providers.

While mobile edge computing will bring many changes and improvements to cellular communications networks, the potential uses and advantages of mobile edge computing have only begun to be developed. Therefore, there is a need in the industry to take advantage of mobile edge computing to further improve the cellular communications networks in which mobile edge computing will be deployed.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
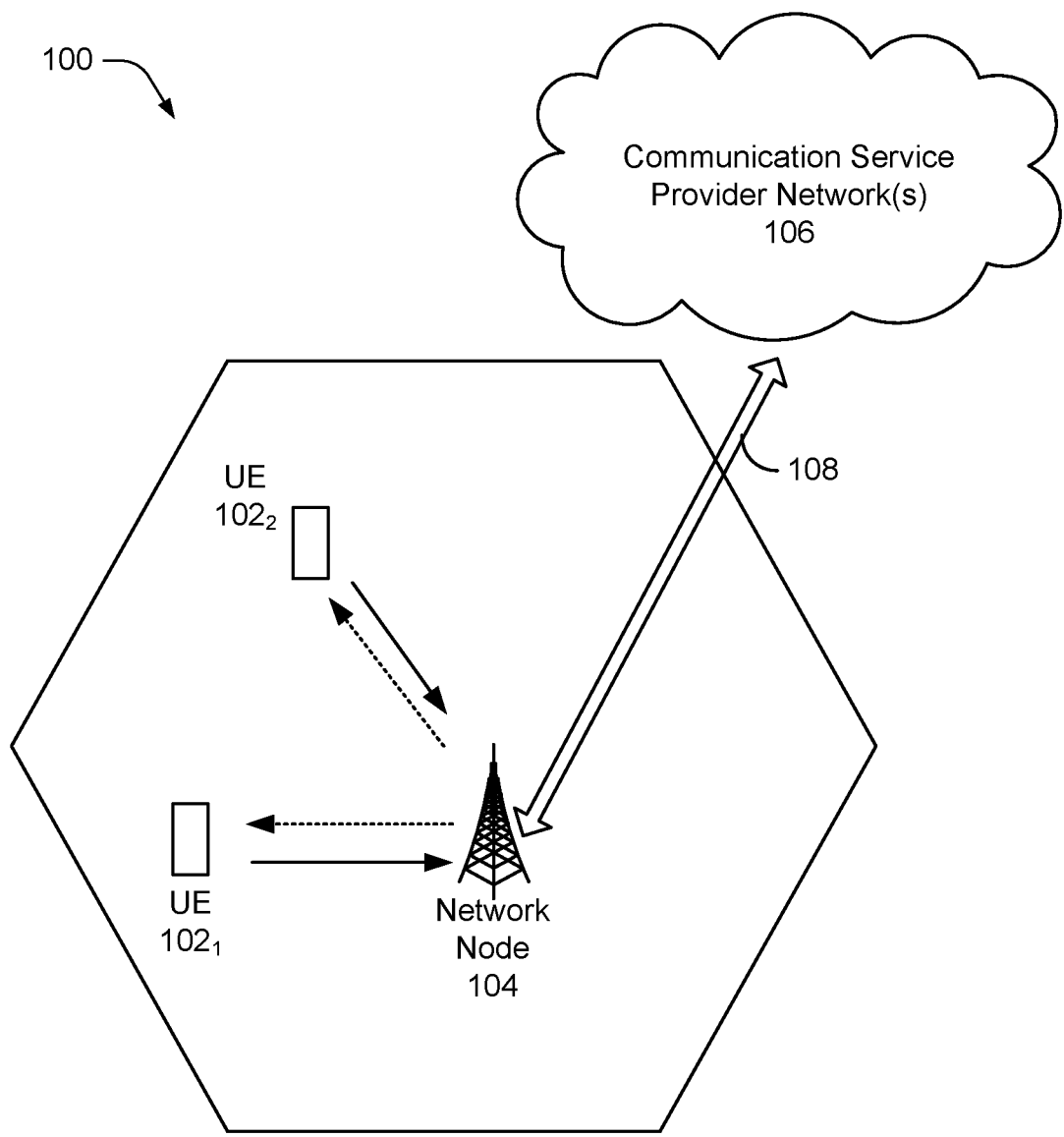
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards session mapping in multi-access communication networks equipped with mobile edge computing technology, such as 5G and subsequent generation networks. An architecture including a UE and a MEC can use "virtual sessions" to enable service continuity in multi-access environments. A MEC can terminate a main session between the core and the MEC, and based on the services and the states of the access network in the multi-access environment, the MEC can dynamically route/bridge the main session to one or more virtual sessions in the multiple access technologies environment, thereby providing seamless session continuity in the operators' network.

Mobile operators need competitive solutions to provide end users with a seamless experience of mobility across many different access technologies including third generation partnership project (3GPP) and non-3GPP technologies, such as Wi-Fi and satellite. For example, a user watching a video at a coffee shop using Wi-Fi should be able continue the video experience when leaving the Wi-Fi area and moving to a LTE/5G network, or to an area with satellite service. Similarly, a user watching a video started in a LTE/5G service area should be able continue the video experience when walking into a coffee shop and connecting to Wi-Fi, or when moving into an area of satellite service. Mobility management and service continuity across many access technologies is very important.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs $102_1$, $102_2$, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
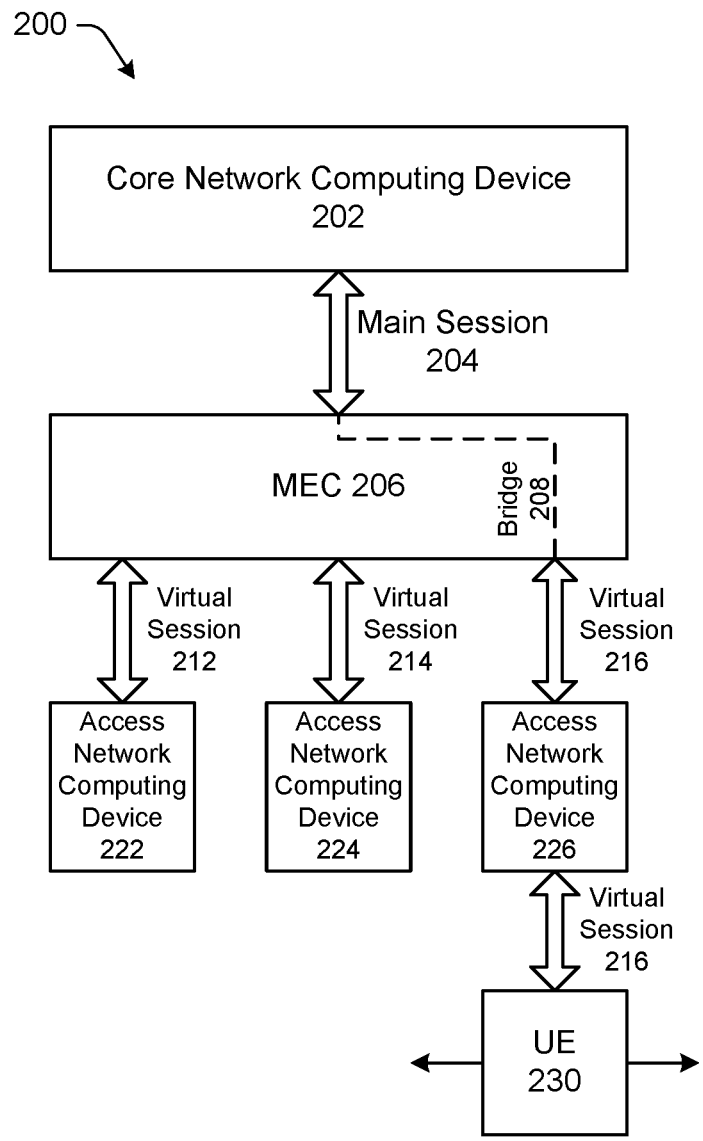
FIG. 2 provides an example architecture including a core network computing device, a mobile edge computing device (MEC), multiple access network computing devices, and a UE, in accordance with various aspects and embodiments of the subject disclosure.

FIG. 2 provides an example architecture including a core network computing device, a MEC, multiple access network computing devices, and a UE, in accordance with various aspects and embodiments of the subject disclosure. The example architecture 200 includes a MEC 206 in a main session 204 with a core network computing device 202, and the MEC 206 in multiple virtual sessions 212, 214, and 216 with multiple access network computing devices 222, 224, and 226. In the illustrated example, one of the virtual sessions 216 is used by a UE 230.

In an example, the UE 230 can connect to any appropriate access network computing devices 222, 224, and 226, thereby communicating via any appropriate virtual session of the virtual sessions 212, 214, and 216. In FIG. 2, the UE 230 is illustrated as connected to access network computing device 226, thereby communicating via virtual session 216. As UE 230 moves from one location to another, as indicated by the horizontal arrows from UE 230, UE 230 can connect to other access network computing devices via other virtual sessions.

MEC 206 can comprise a server which provide cloud computing services at an edge of a communications network. MEC 206 can bridge between main session 204 and the virtual session(s) to which the UE 230 is connected. For example, in FIG. 2, MEC 206 establishes a bridge 208 between main session 204 and virtual session 216. If UE 230 moves to a next virtual session, such as virtual session 214, MEC 206 can establish a bridge between main session 204 and the next virtual session 214.

In FIG. 2, the different access network computing devices 222, 224, and 226 can represent different access technologies, such as cellular, Wi-Fi, satellite, and so on. These different access technologies can use different session information. By discovering access network computing devices 222, 224, and 226 and establishing virtual sessions 212, 214, and 216 in advance of UE 230 communicating via access network computing devices 222, 224, and 226, the MEC 206 can enhance the speed and continuity of communications with UE 230.

Figure 3:
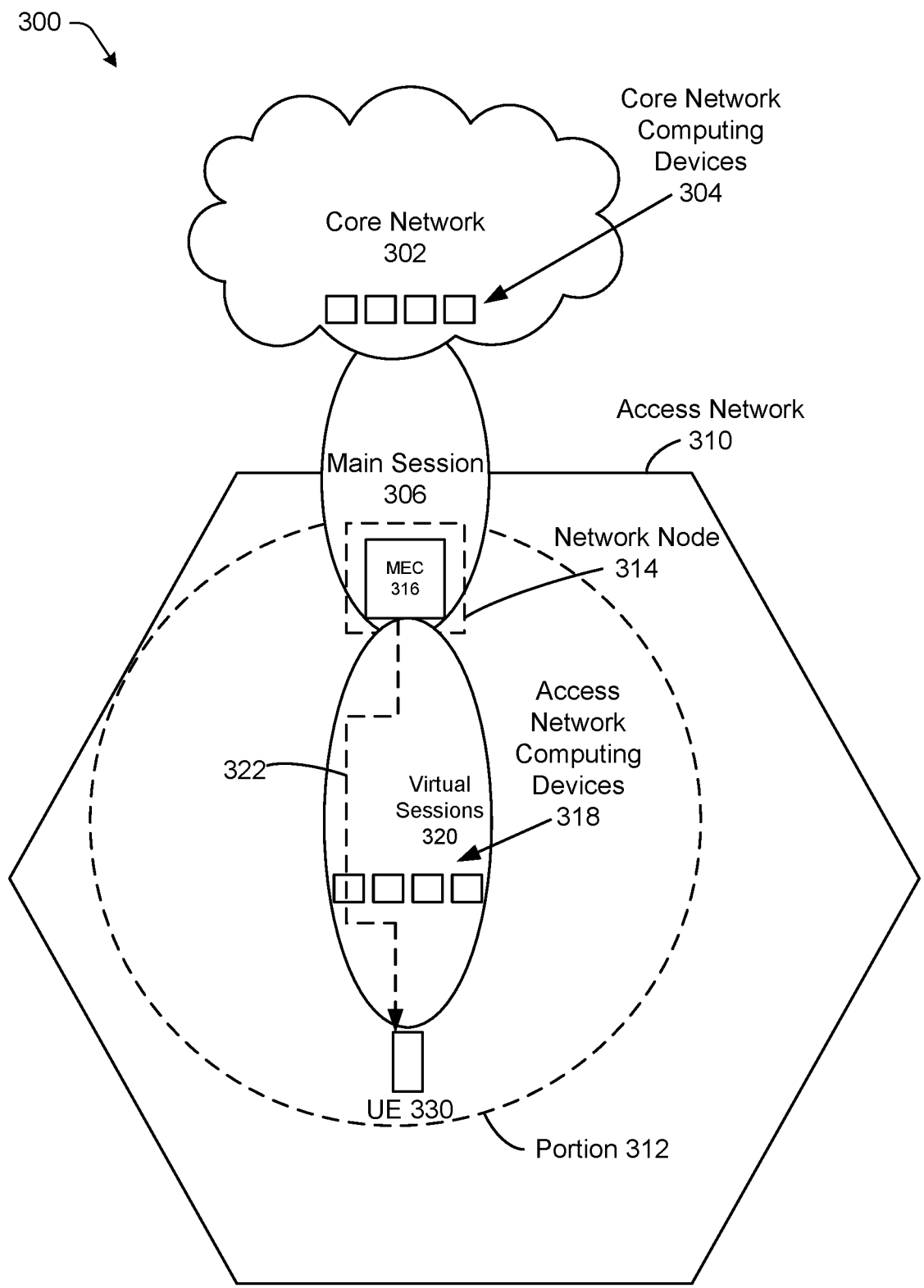
FIG. 3 is a schematic diagram of an example wireless communication system with single session to multiple sessions mapping, in accordance with various aspects and embodiments of the subject disclosure.

FIG. 3 is a schematic diagram of an example wireless communication system with single session to multiple sessions mapping, in accordance with various aspects and embodiments of the subject disclosure. Wireless communication system 300 comprises elements similar to those introduced in FIG. 1, and elements of FIG. 1 can be supplemented or modified as illustrated in FIG. 3. FIG. 3 includes a core network 302 with core network computing devices 304, an access network 310 and a particular portion 312 of access network 310. The portion 312 includes MEC 316 at network node 314, access network computing devices 318, and UE 330. The MEC 316 can establish a main session 306 with core network 302, namely, with one or more of core network computing devices 304. The MEC 316 can furthermore identify access network computing devices 318 which serve portion 312, and with which MEC 316 can establish virtual sessions 320. Example virtual session 322 is a virtual session of virtual sessions 320 which is currently in use by UE 330. The UE 330 can transition into another virtual session of virtual sessions 320 when advantageous due to location or service requirement changes at UE 330. In some circumstances, the UE 330 can be simultaneously in multiple of virtual sessions 320.

Figure 4:
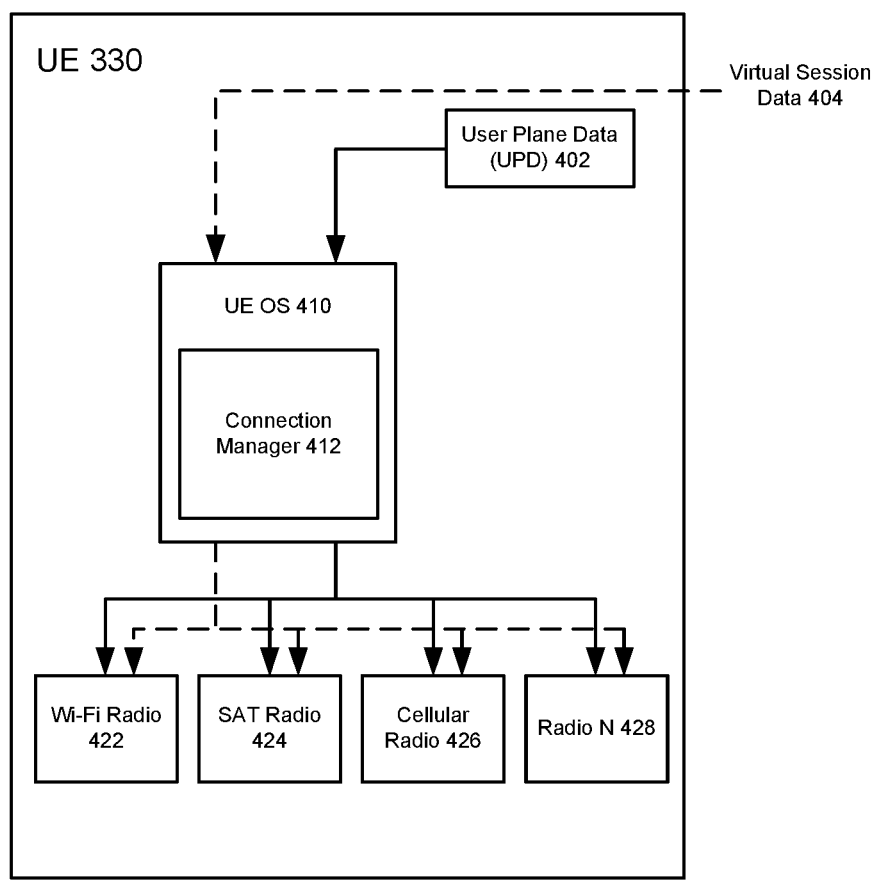
FIG. 4 is a block diagram of an example user equipment (UE) in accordance with various aspects and embodiments of the subject disclosure.

FIG. 4 is a block diagram of an example user equipment (UE) in accordance with various aspects and embodiments of the subject disclosure. UE 330 in FIG. 4 provides a detailed view of aspects of the UE 330 introduced in FIG. 3. In addition to the many other features and functions of a UE described in connection with FIG. 1, UE 330 can comprise a UE operating system (OS) 410 equipped with a connection manager 412, as well as various radios for different access technologies, such as a Wi-Fi radio 422, a satellite (SAT) radio 424, a cellular radio 426, and any other radios, designated as example radio N 428.

In some implementations, the connection manager 412 can consume user plane data 402 and virtual session data 404. Virtual session data 404 can comprise, e.g., IP addresses for virtual sessions established by a MEC 316, and other session information as may be desired at UE 330. In particular, virtual session data 404 can comprise an IP address and other session information for a next virtual session to be entered by UE 330. Virtual session data 404 can originate from MEC 316 and can also be sent to appropriate access network computing devices.

The connection manager 412 can apply the user plane data 402 and virtual session data 404 at a radio of radios 422, 424, 426, and 428, in order to enter a next virtual session according to virtual session data 404. For example, if a current session is a Wi-Fi session using Wi-Fi radio 422, and next virtual session data 404 arrives with session data for a cellular session using cellular radio 426, the connection manager 412 can apply the user plane data 402 and virtual session data 404 at cellular radio 426 to seamlessly transition from the use of Wi-Fi radio 422 to cellular radio 426. Similarly, transitions to and from any of the radios 422, 424, 426, and 428 can be made according to virtual session data 404.

Figure 5:
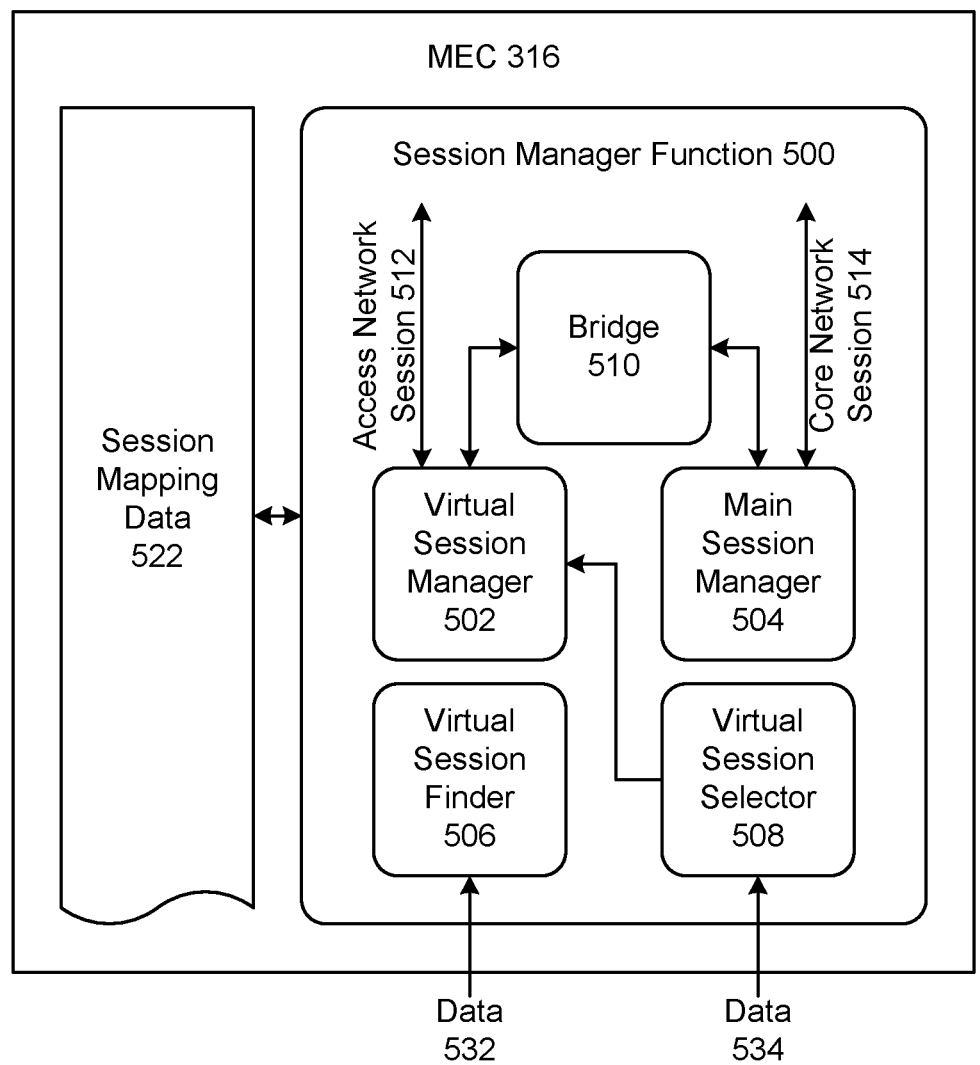
FIG. 5 is a block diagram of an example MEC in accordance with various aspects and embodiments of the subject disclosure.

FIG. 5 is a block diagram of an example MEC in accordance with various aspects and embodiments of the subject disclosure. MEC 316 in FIG. 5 provides a detailed view of aspects of the MEC 316 introduced in FIG. 3. In addition to the many other features and functions of a MEC, MEC 316 can comprise session mapping data 522 and a session manager function 500. Session manager function 500 can include a virtual session manager 502, a main session manager 504, a virtual session finder 506, a virtual session selector 508, and a bridge 510. It will be appreciated that FIG. 5 provides one example set of components and an example arrangement thereof, and numerous other components and arrangements can be made by those of skill in the art.

In FIG. 5, the session manager function 500 can record main (core network) session data for a particular UE in session mapping data 522. Virtual session finder 506 can use data 532, e.g., current location data corresponding to the UE of the main session, to identify access network devices that can provide service to the UE at its current location. The session manager function 500 can then establish virtual sessions with the identified access network devices, and the session manager function 500 can record the virtual session data in session mapping data 522, wherein the virtual session data can be mapped or otherwise cross-referenced to the main session data for the particular UE.

In some examples, virtual session selector 508 can use data 534 to select an appropriate virtual session for the UE, from session mapping data 522. Data 534 can include current location data and/or service requirements for the UE. Virtual session selector 508 can optionally select a virtual session that can provide service at the current location of the UE and can meet or exceed service requirements for the UE. Virtual session selector 508 can notify the virtual session manager 502 of any selected virtual session.

In a further aspect, virtual session manager 502 can engage in access network session 512 by facilitating communications by the UE in the virtual session selected by virtual session selector 508. For example, virtual session manager 502 can send, to the UE, virtual session data 404 (see FIG. 4) for a virtual session selected by virtual session selector 508, and virtual session manager 502 can configure bridge 510 to direct communications from a core network session 514 into the access network session 512, and vice versa. Similarly, main session manager 504 can engage in core network session 514 by configuring bridge 510 to direct communications from core network session 514 into the access network session 512, and vice versa.

The components illustrated in FIG. 5 can be designed to operate dynamically as a UE moves from location to location, or as service requirements change for the UE. For example, a displacement of the UE can introduce new data 532 to virtual session finder 506, and the session manager function 500 can record new virtual session data, identified by virtual session finder 506, in session mapping data 522. Session manager function 500 can also establish new virtual sessions corresponding to the newly identified virtual sessions. Similarly, new data 534 can cause virtual session selector 508 to select a next appropriate virtual session for the UE, and the transition to the next session can be handled by virtual session manager 502.

Figure 6:
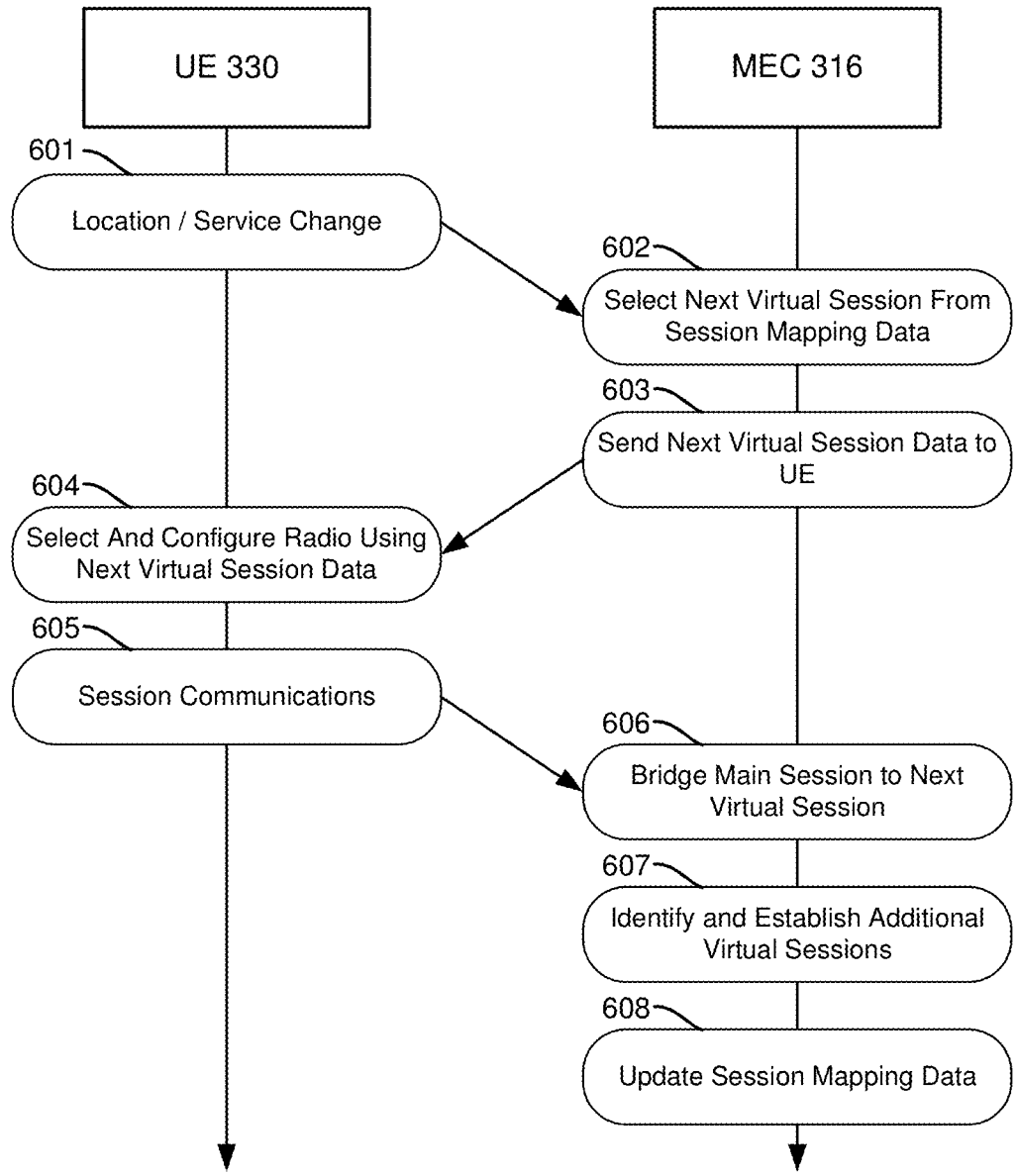
FIG. 6 illustrates example operations of a UE and a MEC, and interactions there between, in accordance with various aspects and embodiments of the subject disclosure.

FIG. 6 illustrates example operations of a UE and a MEC, and interactions there between, in accordance with various aspects and embodiments of the subject disclosure. At 601, UE 330 can undergo a change of location or change of service requirements. At 602, in response to the location/service change at UE 330, the MEC 316 can select a next virtual session from session mapping data. At 603, the MEC 316 can send next virtual session data to the UE 330. At 604, in response to receiving the next virtual session data, the UE 330 can select and configure a radio using the received next virtual session data. At 605, the UE 330 has entered the next virtual session, and the UE 330 can engage in session communications using the configured radio. At 606, the MEC 316 can bridge the main session, with the core network, and the next virtual session with an access network device. Operation 606 can continue until a further change of virtual session. At 607, the MEC 316 can identify and establish additional virtual sessions as appropriate for any location and service requirement changes at the UE 330. At 607, the MEC 316 can update session mapping data to include any additional virtual sessions established at operation 606. These additional virtual sessions are now available for possible future use. Any further location or service changes can trigger a return to operation 601 and the operations of FIG. 6 can be repeated as often as appropriate.

Figure 7:
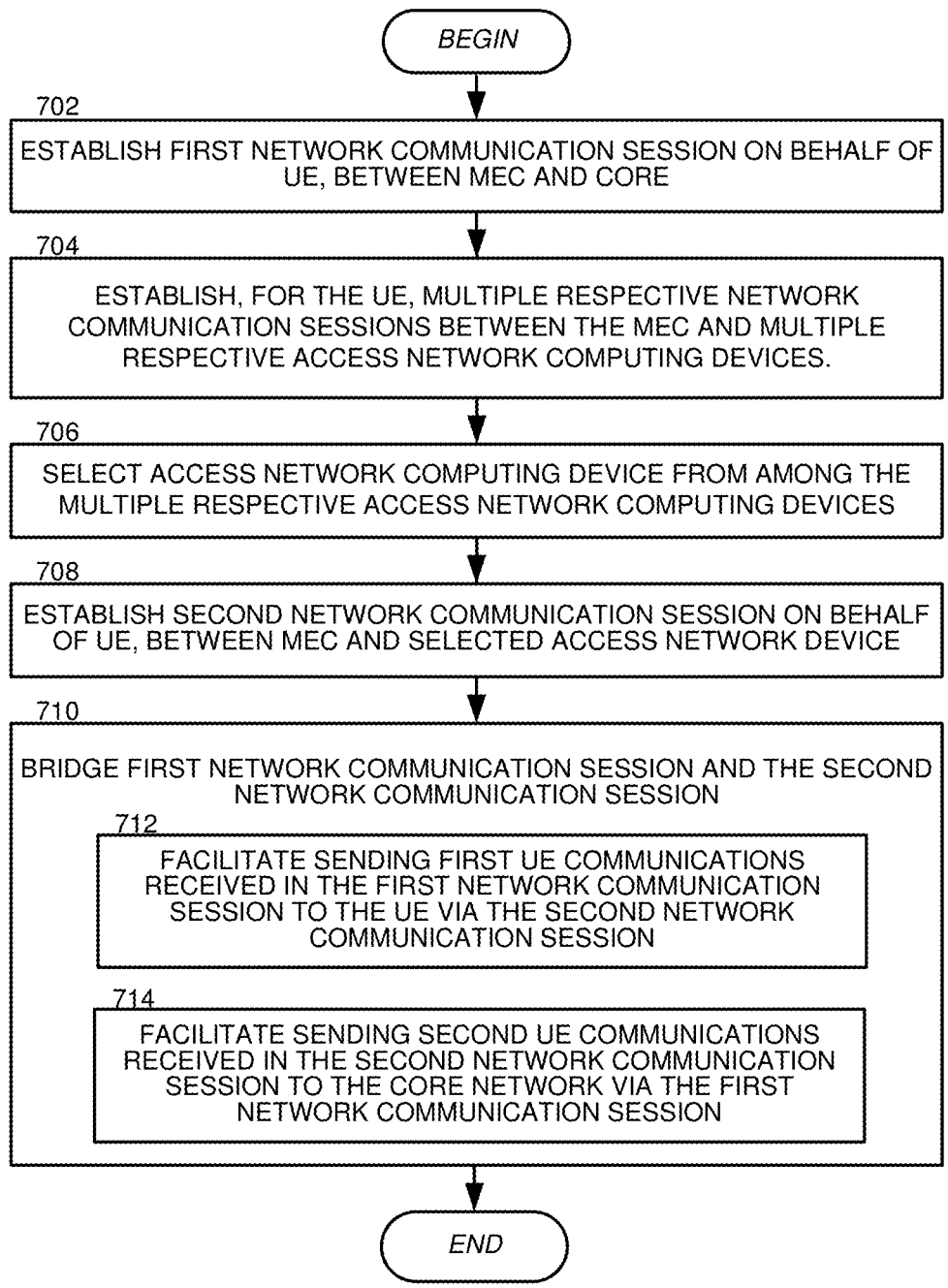
FIG. 7 is a flow diagram representing a first set of example operations of a MEC, in accordance with various aspects and embodiments of the subject disclosure.

FIG. 7 is a flow diagram representing a first set of example operations of a MEC, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 702, which represents establishing a first network communication session on behalf of a UE, between a MEC and a core network. For example, as illustrated in FIG. 3, MEC 316 can facilitate establishing a first network communication session, namely main session 306, on behalf of UE 330. The first network communication session 306 is between the MEC 316 and a core network computing device of core network computing devices 304. In some embodiments, MEC 316 can be located at and coupled with a base station or other network node 314 of a cellular communications network.

Example operations comprise operation 704, which represents establishing, for the UE, multiple respective network communication sessions between the MEC and multiple respective access network computing devices. For example, as illustrated in FIG. 3, MEC 316 can facilitate establishing, for the UE 330, multiple respective network communication sessions (virtual sessions 320) between the MEC 316 and multiple respective access network computing devices 318. Access network computing devices 318 can comprise, e.g., cellular communications network base station devices, Wi-Fi devices, and/or satellite communication devices.

Example operations comprise operation 706, which represents selecting an access network computing device from among the multiple respective access network computing devices. For example, as illustrated in FIG. 3, MEC 316 can facilitate selecting an access network computing device from among the multiple respective access network computing devices 318.

Example operations comprise operation 708, which represents establishing a second network communication session on behalf of the UE, wherein the second communication session is between the MEC and the selected access network device. For example, as illustrated in FIG. 3, MEC 316 can facilitate establishing a second network communication session 322 on behalf of the UE 330, wherein the second network communication session 322 is between the MEC 316 and an access network computing device selected at block 706.

In some embodiments, establishing network communication sessions at blocks 702, 704, and 708 can involve configuring session data, e.g., by a session manager function 500 as illustrated in FIG. 5. For example, a first IP address can be established and used in connection with the first network communication session, and a second IP address can be established and used in connection with the second network communication session. The second IP address can optionally be sent to the UE 330, e.g., as virtual session data 404, illustrated in FIG. 4.

Example operations comprise operation 710, which represents bridging the first network communication session and the second network communication session. For example, as illustrated in FIG. 3, MEC 316 can facilitate bridging the first network communication session, established at block 702, and the second network communication session, established at block 708. Operation 710 can comprise operations 712 and 714.

Example operations comprise operation 712, which represents facilitating sending first UE communications, received in the first network communication session, to the UE via the second network communication session. For example, as illustrated in FIG. 3, MEC 316 can facilitate sending first UE communications received in the first network communication session 306 to the UE via the second network communication session 322.

Example operations comprise operation 714, which represents facilitating sending second UE communications received in the second network communication session to the core network via the first network communication session. For example, as illustrated in FIG. 3, MEC 316 can facilitate sending second UE communications received in the second network communication session 322 to the core network computing device 304 via the first network communication session 306.

Figure 8:
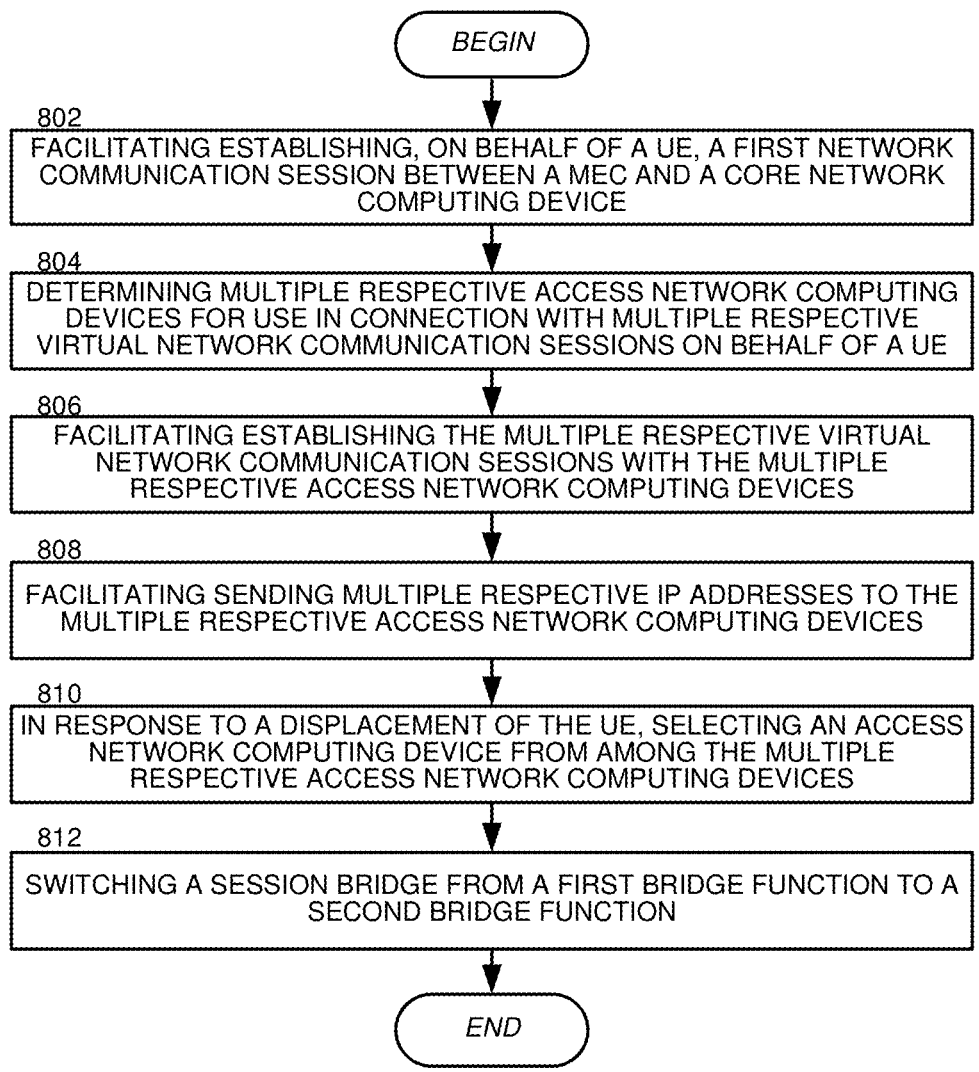
FIG. 8 is a flow diagram representing a second set of example operations of a MEC, in accordance with various aspects and embodiments of the subject disclosure.

FIG. 8 is a flow diagram representing a second set of example operations of a MEC, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 802, which represents facilitating establishing, on behalf of a UE, a first network communication session between a MEC and a core network computing device. For example, as illustrated in FIG. 3, MEC 316 can facilitate establishing, on behalf of UE 330, a first network communication session 306 between the MEC 316 and a core network computing device of core network computing devices 304.

Example operations comprise operation 804, which represents determining multiple respective access network computing devices for use in connection with multiple respective virtual network communication sessions on behalf of a UE. For example, as illustrated in FIG. 3, MEC 316 can determine multiple respective access network computing devices 318, which devices 318 can be a subset of devices within MEC's 316 portion 312 of the access network 310, for use in connection with multiple respective virtual network communication sessions 320 on behalf of the UE 330.

Example operations comprise operation 806, which represents facilitating establishing the multiple respective virtual network communication sessions with the multiple respective access network computing devices. For example, as illustrated in FIG. 3, MEC 316 can facilitate establishing the multiple respective virtual network communication sessions 320 with the multiple respective access network computing devices 318, wherein the multiple respective virtual network communication sessions 320 are between the MEC 316 and the multiple respective access network computing devices 318.

Example operations comprise operation 808, which represents facilitating sending multiple respective IP addresses to the multiple respective access network computing devices. For example, as illustrated in FIG. 3, MEC 316 can send multiple respective IP addresses, and other session configuration information as appropriate, to the multiple respective access network computing devices 318 for use in connection with virtual sessions 320. Furthermore, MEC 316 can itself use the multiple respective IP addresses in connection with the multiple respective virtual network communication sessions 320.

Example operations comprise operation 810, which represents, in response to a displacement of the UE, selecting an access network computing device from among the multiple respective access network computing devices. For example, as illustrated in FIG. 3, in response to a displacement of the UE 330, MEC 316 can facilitate selecting an access network computing device from among the multiple respective access network computing devices 318, resulting in a selected access network computing device. A second session 322 of the multiple respective virtual network communication sessions 320 can comprise the selected access network computing device. In an aspect, selecting can be based on at least one of a service available at the selected access network computing device or a state of the multiple respective access network computing devices 318.

Example operations comprise operation 812, which represents switching a session bridge from a first bridge function to a second bridge function. For example, as illustrated in FIG. 3, MEC 316 can facilitate switching a session bridge (bridge 510 in FIG. 5) from a first bridge function to a second bridge function. The first bridge function can bridge communications between the first network communication session 306 and a first session of the multiple respective virtual network communication sessions 320. The second bridge function can bridge communications between the first network communication session 306 and a second session 322 of the multiple respective virtual network communication sessions 320.

Figure 9:
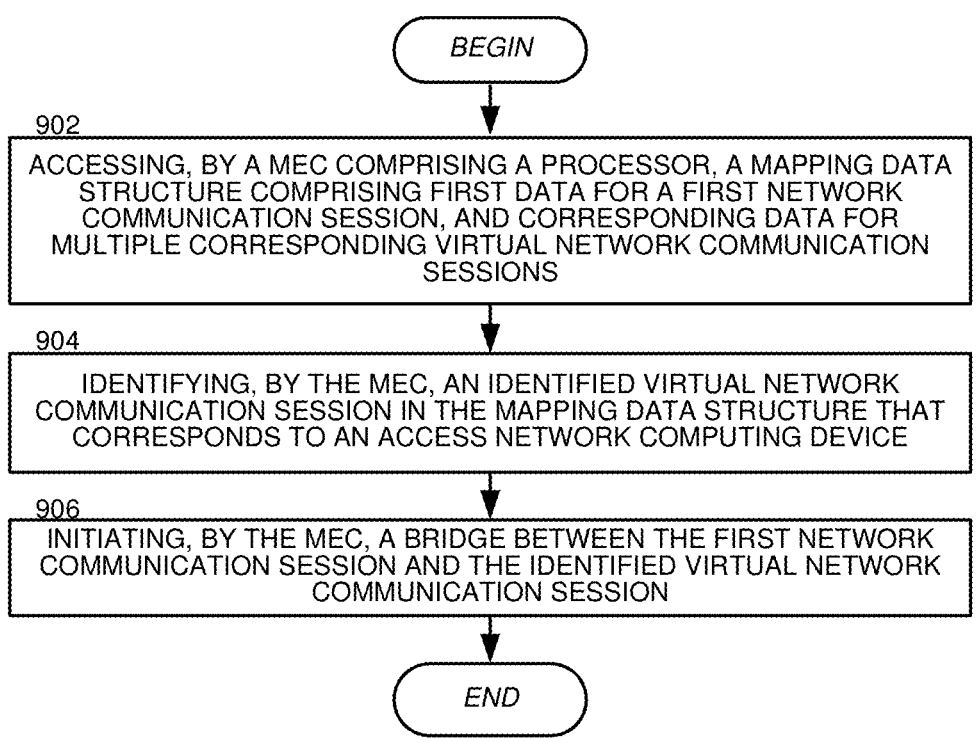
FIG. 9 is a flow diagram representing a third set of example operations of a MEC, in accordance with various aspects and embodiments of the subject disclosure.

FIG. 9 is a flow diagram representing a third set of example operations of a MEC, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Example operations comprise operation 902, which represents accessing, by a MEC comprising a processor, a mapping data structure comprising first data for a first network communication session, and corresponding data for multiple corresponding virtual network communication sessions. For example, as illustrated in FIG. 5, MEC 316 can access session mapping data 522, comprising first data for a first network communication session, such as main session 306 illustrated in FIG. 3, and corresponding data for multiple corresponding virtual network communication sessions, such as virtual sessions 320 illustrated in FIG. 3.

In an aspect, the first data for the first network communication session 306 can define a session between the MEC 316 and a core network computing device of core network computing devices 304. The first data for the first network communication session 306 can also comprise, e.g., a quality of service specification, an IP address, and other information for the first network communication session 306. The corresponding data for multiple corresponding virtual network communication sessions can likewise define multiple respective virtual network communication sessions 320 between the MEC 316 and multiple respective access network computing devices 318.

Example operations comprise operation 904, which represents identifying, by the MEC, an identified virtual network communication session in the mapping data structure that corresponds to an access network computing device. For example, as illustrated in FIG. 5, virtual session selector 508 at MEC 316 can identify an identified virtual network communication session, such as virtual network session 322, in the mapping data structure 522 that corresponds to an access network computing device of access network computing devices 318.

Example operations comprise operation 906, which represents initiating, by the MEC, a bridge between the first network communication session and the identified virtual network communication session. For example, as illustrated in FIG. 5, virtual session manager 502 and main session manager 504 at MEC 316 can initiate a bridge 510 between the first network communication session 306 and the identified virtual network communication session 322.

In an aspect, the operations 902, 904, and 906 can be performed in response to a UE 330 transitioning from first communications with a first access network computing device (e.g., of access network computing devices 318) to second communications with a second access network computing device of access network computing devices 318. The access network computing devices 318 can comprise, e.g., a network base station device implementing a cellular communication protocol, a device implementing a Wi-Fi communication protocol, and a communication device implementing a satellite communication protocol.

Figure 10:
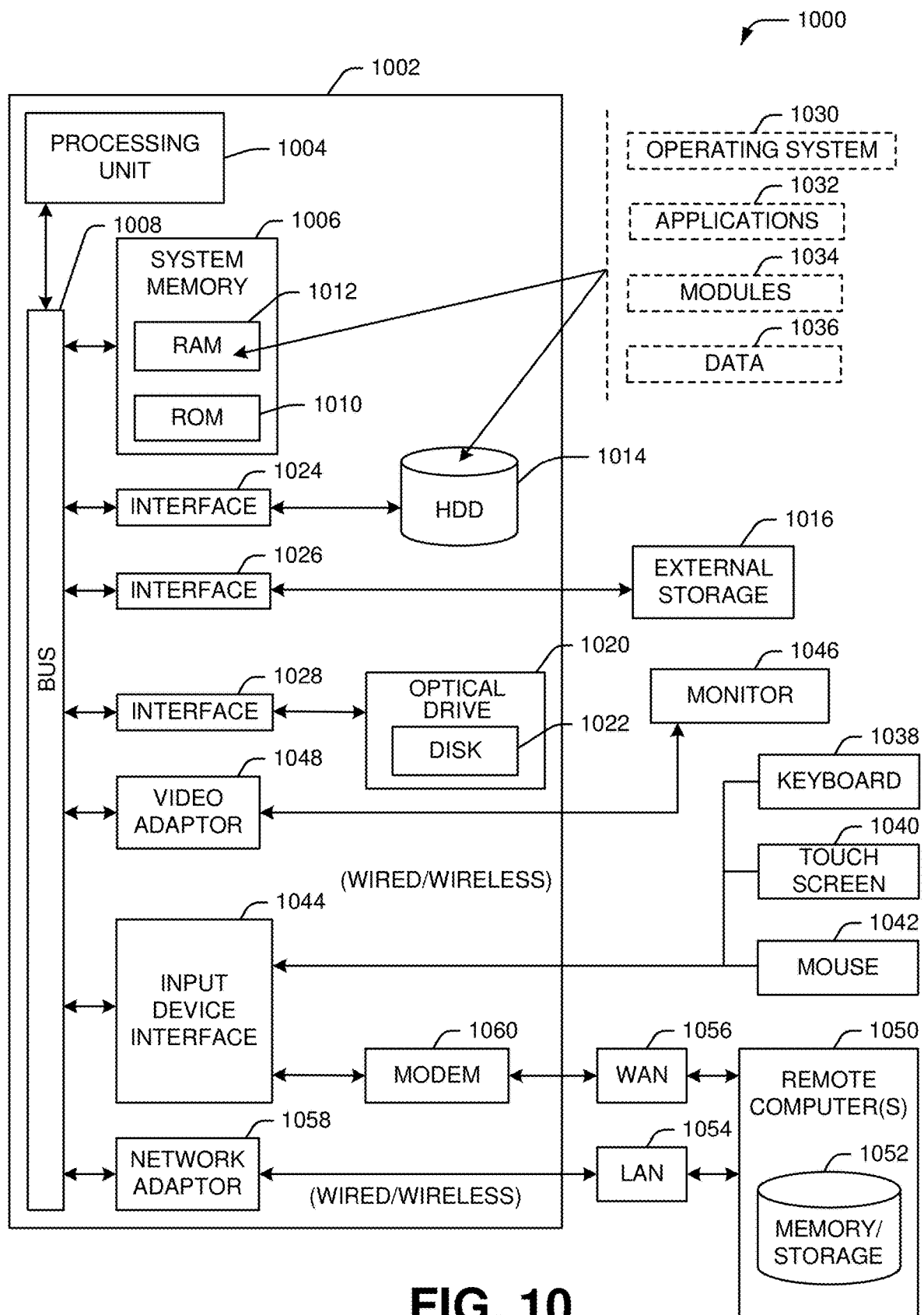
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, a core network computing device, a MEC, an access network computing device, and a UE as described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN)

1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A mobile edge computing device, comprising:
a processor; and a non-transitory memory that stores executable instructions that, when executed by the processor, facilitate performance of operations, comprising:
  facilitating establishing a first network communication session on behalf of a user equipment, wherein the first network communication session is between the mobile edge computing device and a core network computing device;
  facilitating establishing a group of second network communication sessions on behalf of the user equipment, wherein the group of second network communication sessions is established between the mobile edge computing device and multiple respective access network computing devices, wherein the group of second network communication sessions is established in advance of the user equipment communicating via the access network computing devices, and wherein establishing the group of second network communication sessions comprises communicating respective virtual network communication session internet protocol addresses to the multiple respective access network computing devices;
  maintaining session mapping data that maps the group of second network communication sessions and the first network communication session; and
  facilitating bridging the first network communication session and a selected network communication session of the group of second network communication sessions, comprising:
    sending first user equipment communications received in the first network communication session to the user equipment via a selected virtual network communication session internet protocol address associated with the selected network communication session; and
    sending second user equipment communications received in the selected network communication session to the core network computing device via the first network communication session.

2. The mobile edge computing device of claim 1, wherein a base station device of a cellular communications network comprises the mobile edge computing device.

3. The mobile edge computing device of claim 1, wherein the operations further comprise using a first internet protocol address in connection with the first network communication session, and using the selected virtual network communication session internet protocol address in connection with the selected network communication session.

4. The mobile edge computing device of claim 3, wherein the operations further comprise sending the selected virtual network communication session internet protocol address to the user equipment.

5. The mobile edge computing device of claim 1, wherein the group of second network communication sessions comprises virtual network communication sessions.

6. The mobile edge computing device of claim 5, wherein the operations further comprise selecting the selected network communication session of the group of second network communication sessions.

7. The mobile edge computing device of claim 1, wherein an access network computing device of the multiple access network computing devices comprises a cellular communications network base station device, a Wi-Fi device, or a satellite communication device.

8. The mobile edge computing device of claim 1, wherein the mobile edge computing device comprises a session manager function that facilitates the establishing of the first network communication session on behalf of the user equipment.

9. A non-transitory machine-readable medium, comprising executable instructions that, when executed by a processor of a mobile edge computing device, facilitate performance of operations, comprising:
  establishing, on behalf of a user equipment, a first network communication session between the mobile edge computing device and a core network computing device;
  determining multiple respective access network computing devices for use in connection with multiple respective virtual network communication sessions on behalf of the user equipment;
  establishing the multiple respective virtual network communication sessions with the multiple respective access network computing devices, wherein the multiple respective virtual network communication sessions are between the mobile edge computing device and the multiple respective access network computing devices, and wherein establishing the multiple respective virtual network communication sessions comprises communicating multiple respective virtual network communication session internet protocol addresses to the multiple respective access network computing devices in advance of the user equipment communicating via the multiple respective access network computing devices;
  maintaining session mapping data that maps the multiple respective virtual network communication sessions and the first network communication session;
  switching a session bridge from a first bridge function to a second bridge function, wherein the first bridge function bridges communications between the first network communication session and a first session of the multiple respective virtual network communication sessions, and wherein the second bridge function bridges communications between the first network communication session and a second session of the multiple respective virtual network communication sessions; and
  using a virtual network communication session internet protocol address of the multiple respective virtual network communication session internet protocol addresses in connection with the second bridge function.

10. The non-transitory machine-readable medium of claim 9, wherein the operations further comprise selecting an access network computing device from among the multiple respective access network computing devices, resulting in a selected access network computing device, and wherein the second session of the multiple respective virtual network communication sessions comprises the selected access network computing device.

11. The non-transitory machine-readable medium of claim 10, wherein the selecting is in response to a displacement of the user equipment.

12. The non-transitory machine-readable medium of claim 10, wherein the selecting is based on at least one of a service available at the selected access network computing device or a state of the multiple respective access network computing devices.

13. The non-transitory machine-readable medium of claim 10, wherein the mobile edge computing device is communicatively coupled with a base station of a cellular communications network.

14. The non-transitory machine-readable medium of claim 9, wherein an access network computing device of the multiple respective access network computing devices comprises a cellular communications network base station device.

15. The non-transitory machine-readable medium of claim 9, wherein establishing the first network communication session between the mobile edge computing device and the core network computing device is performed by a session manager function of the mobile edge computing device.

16. A method, comprising:
   accessing, by a mobile edge computing device comprising a processor, a mapping data structure comprising first data for a first network communication session, and corresponding data for multiple corresponding virtual network communication sessions,
   wherein the first data for the first network communication session defines the first network communication session as a session between the mobile edge computing device and a core network computing device,
   wherein the corresponding data for multiple corresponding virtual network communication sessions defines multiple respective virtual network communication sessions between the mobile edge computing device and multiple respective access network computing devices,
   wherein the corresponding data for multiple corresponding virtual network communication sessions comprises respective virtual network communication session internet protocol addresses for the multiple corresponding virtual network communication sessions, and
   wherein the mobile edge computing device establishes the multiple respective virtual network communication sessions in advance of the user equipment communicating via the multiple respective access network computing devices;
   identifying, by the mobile edge computing device, an identified virtual network communication session in the mapping data structure that corresponds to an access network computing device; and
   initiating, by the mobile edge computing device, a bridge between the first network communication session and the identified virtual network communication session using a respective virtual network communication session internet protocol address of the respective virtual network communication session internet protocol addresses.

17. The method of claim 16, wherein the accessing, the identifying and the initiating are performed in response to a user equipment transitioning from first communications with a first access network computing device to second communications with a second access network computing device.

18. The method of claim 16, wherein the mapping data structure comprises a quality of service specification for the first network communication session.

19. The method of claim 16, wherein the mobile edge computing device is communicatively coupled with a base station of a cellular communications network.

20. The method of claim 16, wherein the multiple respective access network computing devices comprise a network base station device implementing a cellular communication protocol, a device implementing a Wi-Fi communication protocol, and a communication device implementing a satellite communication protocol.

* * * * *